United States Patent

Hercher et al.

[15] 3,707,687
[45] Dec. 26, 1972

[54] DYE LASER TUNABLE BY LONGITUDINAL DISPERSION IN THE DYE CELL

[72] Inventors: Michael Hercher; Harold Alan Pike, both of Rochester, N.Y.

[73] Assignee: Spectra Physics, Inc., Mountain View, Calif.

[22] Filed: Dec. 29, 1970

[21] Appl. No.: 102,285

[52] U.S. Cl. ................................................331/94.5
[51] Int. Cl. .................................................H01s 3/08
[58] Field of Search .....................................331/94.5

[56] References Cited

UNITED STATES PATENTS 3,422,370  1/1969  Collins, Jr. .........................331/94.5

OTHER PUBLICATIONS

Sorokin et al., End-Pumped Stimulated Emission from a Thiacarbocyanine Dye. IBM Journal (Sept. 1966) pg 401.

Sorokin et al., Laser-Pumped Stimulated Emission from Organic Dyes: Experimental Studies and Analytical Comparisons. IBM Journal (Mar. 1967) pp 130–148.

*Primary Examiner*—William L. Sikes
*Attorney*—Hoffman Stone

[57] ABSTRACT

A single mirror serves both as the output mirror for the pumping gas laser and the high reflectance mirror for the dye laser. The mirror is formed on one surface of a lens having a low dispersion characteristic. The dye cell is positioned at the focus of the lens on the opposite side of the lens from the common mirror. The output of the dye laser is taken through a second mirror formed on an output lens of high dispersion material. Tuning is done by moving the output lens toward and away from the dye cell, or by varying the tilt of an etalon plate positioned between the dye cell and the output lens, or both.

2 Claims, 1 Drawing Figure

PATENTED DEC 26 1972        3,707,687
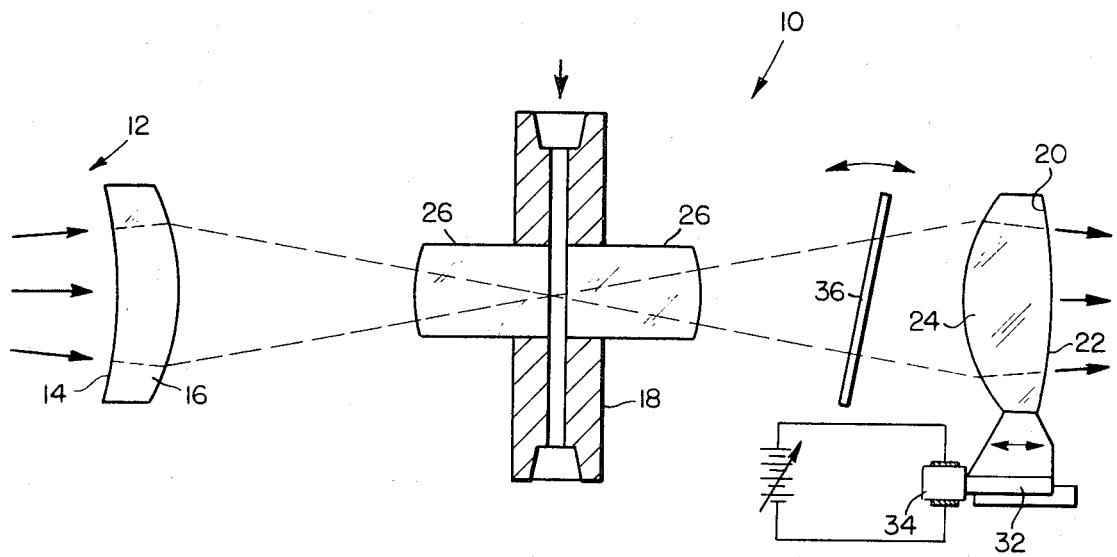
INVENTORS
MICHAEL HERCHER
BY    H. ALAN PIKE
ATTORNEY

DYE LASER TUNABLE BY LONGITUDINAL DISPERSION IN THE DYE CELL

BRIEF DESCRIPTION

This invention relates to a novel dye laser and, more particularly, to a novel laser pumped dye laser which is readily tunable over a wide spectral range.

Dye lasers are known, and it is also known that for efficient operation, especially when continuous output is desired, they must be pumped by another laser, rather than by ordinary light. See, for example, the following articles:

"Lasers Based on Solutions of Organic Dyes" by B. I. Stepanov and A. N. Rubinov, Soviet Physics Uspekhi, Volume II, page 304, 1968.

"Flashlamp Excited Organic Dye Lasers" by B. B. Snavely, Proc. I. E. E. E., Volume 57, page 1374, 1969.

"CW Operation of an Organic Dye Solution Laser" by O. G. Peterson, S. A. Tuccio, and B. B. Snavely, Applied Physics Letters, Volume 17, page 245, 1970.

In the laser pumped configuration, a gas laser is typically arranged with its output aimed at the dye cell of the dye laser through the high reflectance mirror of the dye laser. For efficient transfer of energy into the dye laser, the mirror must be highly transparent to the output of the gas laser. At the same time, to enable resonance in the dye laser, the mirror must be highly reflective to light produced in the dye laser. These requirements are not readily compatible with each other, and present a difficult design problem.

Briefly, according to the invention, the problem is resolved by using a single mirror as both the output mirror of the pumping gas laser and the high reflectance mirror of the pumped dye laser. The design requirements of the single, dual purpose mirror are easier to meet than the requirements for the high reflectance mirror of the dye laser as used in the previously suggested arrangement, and improved efficiency of operation is achieved, as well as economy of construction.

Another feature of the invention relates to a relatively simple arrangement for tuning the dye laser, that is, for adjusting its output to any desired wave length within the capability of the particular dye used. The arrangement includes a lens having relatively large longitudinal chromatic aberrations (a high dispersion characteristic) at the output end of the dye laser for focusing the internally resonating light from the output mirror back onto the dye cell. The output mirror is formed on the surface of the lens opposite from the dye cell. The wavelength of the light reflected from the output mirror and focused by the lens at the reaction zone of the dye cell depends, because of the aberration, on the spacing of the lens from the cell, and motion of the lens toward and away from the cell thus changes the wavelength of the light emitted by the laser. If desired, tuning can also be effected by changing the tilt of an etalon plate mounted between the dye cell and the output lens.

DETAILED DESCRIPTION

A presently preferred embodiment of the invention will now be described in connection with the accompanying drawing, wherein the single FIGURE is a schematic diagram of a dye laser according to the presently preferred embodiment of the invention.

As shown, the dye laser 10 is arranged to be pumped by a gas laser 12. The output mirror 14 of the gas laser serves also as the high reflectance mirror of the dye laser. It is formed on the input lens 16 of the dye laser on the surface facing the gas laser. Typically, the mirror 14 is designed to transmit somewhat less than five percent of the light generated in the gas laser and impinging on it and to reflect the rest. As the high reflectance mirror of the dye laser, the mirror 14 must reflect more than 99 percent of the light generated in the dye laser and impinging on it. The transmission and reflectance requirements are relatively easy to satisfy, and the design of the mirror 14 is a relatively simple matter. It is designed for maximum reflectance at all wavelengths of interest for the dye laser 10, and with a specified reflectance at the wavelength of the light generated in the gas laser 12, so as to maximize the output of the gas laser.

The input lens 16 is designed for small chromatic aberration (minimum dispersion) so that it maintains both the pumping light and the resonating light always at the reaction zone of the dye cell 18 throughout the tuning range of the dye laser.

An output mirror 20 is formed on the outer surface 22 of an output lens 24, which is mounted for limited reciprocation along the main axis of the laser 10. The output lens 24 according to the invention has a large longitudinal chromatic aberration (a high dispersion characteristic) and thus has different focal lengths for light of different respective colors. A change in spacing between the lens 24 and the dye cell 18 changes the color of the light reflected from the output mirror 20 that is focused in the reaction zone of the dye cell 18 and thereby changes the wavelength of the light resonating in the laser 10 and emitted by it.

Tuning of the dye laser 10 may be done simply by moving the output lens 24 toward and away from the dye cell 18. A piezoelectric crystal 34 may conveniently be used for moving the lens 24 under fine control. As shown, the lens 24 is secured on a slidable carrier 32, which is fixed to one surface of a piezoelectric crystal 34, the opposite surface of which is anchored to a rigid support. The crystal 34 is energized by a d.c. voltage, causing it controllably to change its length thereby to move the carrier 32 with the lens 24 selectively back and forth.

Optionally, for fine adjustments in tuning, an etalon plate 36 may be mounted between the dye cell 18 and the output lens 24. Changes in the angle of the etalon plate relative to the main axis of the laser change the length of the optical path between the dye cell 18 and the output mirror 20, thus effecting a change in the wavelength of resonance.

The windows 26 of the dye cell are preferably of nonpolarizing sapphire. Sapphire is well suited to withstand high temperatures that may be produced in the cell 18, and, more importantly, anti-reflection films can be readily applied to it that are very effective. In accordance with the usual practice, all of the light transmitting surfaces, except the mirrors 14 and 20, are treated to minimize reflection.

The dye is circulated through the dye cell 18 in the usual way to remove heat produced in the cell. Typical dyes that are known to be suitable for use in dye lasers are Rhodamine B, Rhodamine 6G, and fluoroscein.

What is claimed is:

1. A tunable dye laser comprising:
   a transparent dye cell containing a fluid substance capable of lasing at several wavelengths,
   a laser excitation source,
   a pair of mirrors for reflecting light emanating from said dye cell in response to the excitation source, said light having a focal point in said dye cell, at least one of said mirrors comprising a coating on a movable lens having a chromatic dispersion characteristic longitudinally toward said dye cell for focusing a selected one of said several wavelengths in said dye cell, and
   means for controllably moving said movable lens in the direction of said longitudinal dispersion, thereby selecting a wavelength from said several wavelengths.

2. The apparatus of claim 1 wherein said means for controllably moving said movable lens is a piezoelectric crystal with a variable d.c. voltage supply connected thereto wherein motion motion of said crystal in response to said voltage is coupled to said movable lens.

* * * * *